United States Patent

[11] 3,586,865

| [72] | Inventors | Lionel Richard Baker<br>Orpington;<br>Peter Archer, West Wickham; Patricia Ann West, Orpington, all of, England |
|---|---|---|
| [21] | Appl. No. | 834,779 |
| [22] | Filed | June 19, 1969 |
| [45] | Patented | June 22, 1971 |
| [73] | Assignee | British Scientific Instrument Research Association<br>South Chislehurst, Kent, England |
| [32] | Priority | June 21, 1968 |
| [33] | | Great Britain |
| [31] | | 29668/68 |

[54] METHOD OF, AND APPARATUS FOR, INSPECTING THE SHAPE OF SMALL OBJECTS
8 Claims, 3 Drawing Figs.

[52] U.S. Cl. .................................................. 250/222,
250/216, 356/156
[51] Int. Cl. ...................................................... H01j 39/12
[50] Field of Search........................................... 250/221,
222, 216, 237 G, 233, 219 S, 219 TH; 356/170, 171, 156, 158; 350/162

[56] References Cited
UNITED STATES PATENTS

| 3,162,712 | 12/1964 | Ingber .......................... | 250/219 X |
| 3,503,684 | 3/1970 | Preston, Jr. et al. ........... | 350/162 X |
| 3,510,223 | 5/1970 | Cohmann ..................... | 350/162 X |
| 3,512,871 | 5/1970 | Zweig........................... | 350/162 X |
| 3,450,889 | 6/1969 | Baker........................... | 250/219 |

Primary Examiner—Walter Stolwein
Attorney—Watson, Cole, Grindle & Watson

ABSTRACT: A method of and apparatus for ascertaining the profile, uniformity or some other related characteristic of a small object or part of a small object. An optical image of the part of the object under investigation, for example the cutting edge of a cutting tool, is formed and the distribution of intensity of radiation in the image which is formed by light reflected diffracted and/or scattered by the object is Fourier analyzed by optical scanning to provide an electrical signal representing the Fourier transform of the intensity of radiation in said image. A complete transform over a range of spatial frequencies can be provided. Alternatively once a reference transform is known a comparison can be made between the electrical signal produced by a standard object and that produced by the object under test at one or more spatial frequencies.

PATENTED JUN 22 1971  3,586,865

INVENTOR
Lionel Richard Baker
BY Peter Archer
Patricia Ann West
Watson, Cole, Grindle & Watson
ATTORNEY

METHOD OF, AND APPARATUS FOR, INSPECTING THE SHAPE OF SMALL OBJECTS

BACKGROUND TO THE INVENTION

A useful application of the present invention is in inspecting a cutting implement with, for example a pointed end such as a pin, stylus or the like, or a cutting edge such as a knife, razor blade, machine tool or the like. Other applications involve inspecting graticule lines of a measuring instrument for uniformity of width or checking the roundness or profile of pins or the like.

In connection with the inspection of a cutting edge hitherto the profile of a cutting implement is examined near its cutting edge by means of visual comparison between the projected profile and a tolerance template. Hence the quality of the cutting edge is inferred from the shape of the implement near the cutting edge. It is, of course, desirable for inspection to be made of the cutting edge itself but this is usually too small to be readily visible for inspection of this nature.

A general object of the present invention is to provide a method and apparatus which may be used inter alia to directly ascertain the profile uniformity or related characteristic of a small object.

The term "small object" is intended to include objects such as those mentioned above which objects have a portion, such as a cutting edge, which cannot be investigated directly by known techniques or which objects as a whole cannot be investigated by known techniques.

SUMMARY OF THE INVENTION

According to the present invention there is provided a method of ascertaining the profile, uniformity or related characteristic of at least a portion of a small object, said method comprising the steps of subjecting the object or said portion of the object to a beam of electromagnetic radiation which is composed of, or includes, an infrared visual or ultraviolet component, scanning an image formed by the radiation diffracted, reflected and/or scattered by the object to form at least part of a Fourier transform response of the mean intensity of radiation in said image at one or more scanning spatial frequencies, and producing an electrical signal from said scanned image which is indicative of the characteristic under investigation.

The spatial frequency may be varied to provide an analogue electrical signal indicative of the characteristic under test. It is not essential to produce a complete Fourier transform and in another aspect of the invention an electrical signal at one or more spatial frequencies can be compared with that produced by a reference object at said spatial frequency or frequencies.

In accordance with a preferred method the radiation is visible light and a selected portion of the image is formed at a slit and the selected portion is scanned by a rotatable radiation-transmitting disc having radial grating lines on to which said selected portion is focused, the axis of rotation of said disc being movable relative to the slit to vary the scanning spatial frequency.

Further according to the present invention there is provided an apparatus for determining the profile uniformity or related characteristic of at least a portion of a small object, said apparatus comprising a. a source of electromagnetic radiation
b. means for passing radiation from said source onto said portion of the object
c. A Fourier analyzer for receiving an image of the radiation as affected by said portion of the object, said analyzer having means for scanning said image at different spatial frequencies to produce a Fourier transform of the mean intensity of radiation in said image and
d. means for producing an electrical signal from the output of said analyzer, said signal being representative of said Fourier transform and indicative of the characteristic under investigation.

In a preferred embodiment the source produces visible light and can be a laser.

In accordance with the method and operation of the apparatus of this invention an optical image of an object under investigation which may be, for example, the cutting edge of a cutting tool or the tip of a stylus or the like is examined directly. In particular, the distribution of intensity of light reflected diffracted and/or scattered by the presence of the object or the part of the object to be investigated is Fourier analyzed to provide an electrical signal which can provide the Fourier transform of the intensity of light influenced by the object and which is indicative of the characteristic under investigation. Where the characteristic is the sharpness of a cutting edge the reflected diffracted and/or scattered light is a direct function of the sharpness of the object in that a sharper cutting edge will diffract a smaller angular spread of light than will a cutting edge which is less sharp.

The complete Fourier transform of the image of the object or part of the object being inspected may not be necessary once a standard reference transform is known. In other words and by way of example the standard sharpness of a cutting edge will produce a certain electrical signal whereas a somewhat blunter edge will produce a smaller signal at the same control parameter.

The invention may be better understood and various other aspects and features of the present invention may become more apparent from consideration of a constructional embodiment thereof.

BRIEF DESCRIPTION OF DRAWINGS

A constructional embodiment of the present invention will now be described, by way of example only, with reference to the accompanying drawings wherein.

DESCRIPTION OF PREFERRED EMBODIMENT

The apparatus described hereinafter utilizes visible light as electromagnetic radiation. This is not essential and the radiation could consist of or at least include an infrared or an ultraviolet component.

Figure 1:
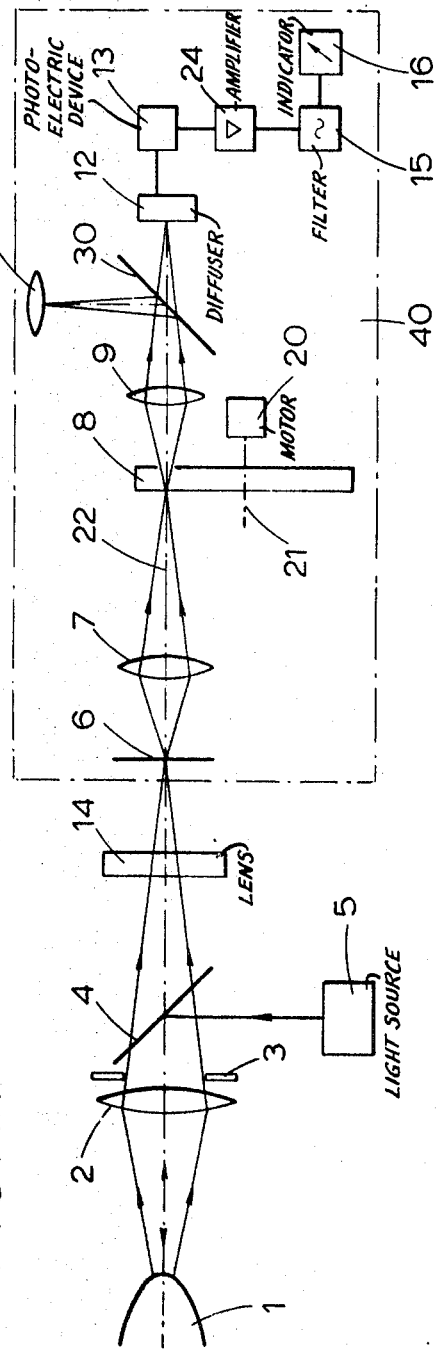
FIG. 1 is a block schematic diagram of an apparatus made in accordance with the present invention.

As shown in FIG. 1, an object has a cutting edge 1 which is to be investigated. The cutting edge 1 is illuminated by a light beam incident normally to the cutting edge 1. This light beam is derived from a light source 5 with a high intrinsic brightness such as a laser. The beam emitted by the source 5 is directed at a first beam splitter 4 which can be for example, a prism, a semisilvered mirror or a like arrangement. The light beam is reflected from the beam splitter 4 and passes through a lens onto the cutting edge 1. The light generally reflected by the object 1 is focused by the lens 2 back through the beam splitter 4 and onto a slit 6 forming the input to a Fourier analyzer generally designated 40. The slit 6 extends perpendicularly to the cutting edge 1. The term "generally reflected" is used because the light impinging on the cutting edge 1 will be reflected diffracted and/or scattered by the cutting edge and hence for brevity the term "reflected" will be used hereinafter.

A cylindrical lens 14 is preferably positioned before the slit 6 in order to defocus the image of the cutting edge 1 so that variations in the intensity of the image of the cutting edge 1, corresponding to variations in sharpness along the cutting edge itself, can be smoothed out. A variable aperture 3 is positioned between the lens 2 and the beam splitter 4 so that the angular deviation of the reflected light can be controlled. This is desirable to ensure that the light scattered from the facets of the cutting edge 1 is blocked out and only a selected desirable portion of the image of the cutting edge is allowed to pass onto the slit 6.

The image produced in the slit 6 is in turn focused by a lens 7 onto a special radial grating in the form of a disc 8 having radial grating lines thereon. The construction of this disc 8 is such as is described in our U.K. Pat. specification 970,369. The magnification of the lens 7 and the spacing of the grating lines on the disc 8 are selected in accordance with the nature and sharpness of the cutting edge 1.

Figure 3:
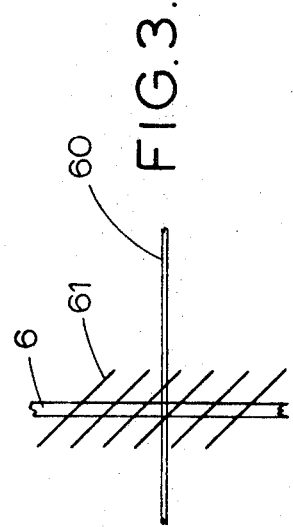
FIG. 3 shows a typical positional relationship between the scanning lines, the optical image and the entrance slit of the apparatus, shown in FIG. 1.

The disc 8 can be rotated at a constant speed by suitable drive means, for example, a synchronous motor 20 and the axis of rotation 21 of the disc 8 is displaceable relative to the optical axis 22 of the apparatus and in particular is rotatable relative thereto. The rotation of the axis 21 about the axis 22 causes the grating lines of the disc 8, rotating at constant speed, to scan the optical image of the cutting edge 1 received by the slit 6 at various angular inclinations. The relationship between the image of the cutting edge 60, the image of the slit 6 and the grating lines 61 of the grating 8 is shown in FIG. 3. The scanning spatial frequency is zero when the lines 61 are parallel to the slit 6 and a maximum when the lines 61 are perpendicular to the slit 6. The spatial frequency itself has a value proportional to the sine of the angle between the lines 61 and the slit 6 and the change in spatial frequency is proportional to the sine of the angle of relative rotation between the axes 21, 22. By varying the rotational relationship between the axes 21, 22 the spatial frequency of the output from the disc 8 is varied. The output from the disc 8 is focused through a lens 9 onto an optical diffuser 12 from whence it passes to a photoelectric device 13. The electrical signal from the device 13 passes through an amplifier 24 and a filter 15 to an indicating instrument 16 which constitutes the output of the apparatus.

The correct operation of the apparatus can be monitored by inspecting a portion of light reflected by a further beam splitter 30 positioned between the lens 9 and the diffuser 12. A lens 31 focuses the reflected portion of light and forms an eyepiece through which the light incident on the acceptance slit 6 can be observed to be in focus.

The indication of the instrument 16 can be observed for various values of spatial frequency altered by rotating the axis 21 of the disc 8 relative to the optical axis 22. The resultant information can be plotted on a graph such as that shown in FIG. 2.

The resultant curve represents the Fourier transform of the mean light intensity in the image of the cutting edge 1 at the disc 8 and can be varied to some extent by altering the width of the slit 6.

Figure 2:
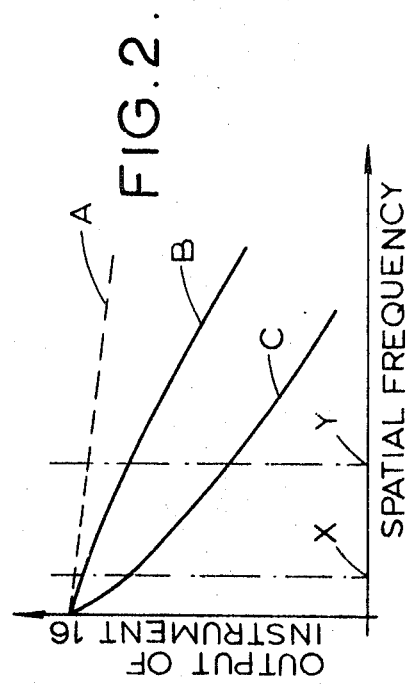
FIG. 2 is a graph showing the relationship between the electrical output of the apparatus and spatial frequency.

As shown in FIG. 2, a perfect sharp edge will produce a hypothetical curve A, a normal sharp edge will produce a curve B and a blunted edge will produce a curve C. As can be readily appreciated from this graph it is possible in gauging techniques to use the output of any one particular spatial frequency to give an indication of the sharpness of the edge of the object under test, say at points X and Y in comparison with that of a reference edge. The width of the slit 6 can be adjusted so that with a standard cutting edge there is little or no variation in the output of instrument 16 with spatial frequency. In this way a drop in the curve at one or more selected spatial frequencies (say X and Y) can be indicative of a cutting edge which is not as sharp as the desired standard.

In this example for a cutting edge producing an optical image of 5 $\mu$m. in width a disc 8 having 10 lines per mm. over its operative portion, a lens 2 of magnification × 40 and a lens 3 of magnification × 5 the maximum spatial frequency obtainable would be about 200 cycles/mm.

It can be appreciated that the apparatus can provide the basis for a more elaborate installation adapted to operate automatically and inspect objects for sharpness or smoothness of profile and reject those outside a given tolerance.

It should also be mentioned that the described application of this invention in assessing the sharpness of cutting edges is only one of many and by way of further examples of application may be mentioned the inspecting of objects such as pins for roundness or of objects such as graticule lines for uniformity of width.

In a modified arrangement which operates in an analogous manner to that described the light source 5 is placed in the operative position of the device 13 in FIG. 1 and the series combination of items 13 to 16 are placed in the operative position of the light source 5 in FIG. 1.

We claim:

1. A method of ascertaining the profile or uniformity of a portion of a small object, said method comprising the steps of:
    a. subjecting said portion of the object to a beam of electromagnetic radiation,
    b. scanning radiation generally reflected by said portion to periodically modulate the intensity of said radiation at one or more selected spatial frequencies,
    c. producing an electrical signal from the scanned radiation which signal forms part of a Fourier transform response of the mean intensity of said radiation at each selected spatial frequency, and
    d. comparing the electrical signal with that produced by a reference object at a particular spatial frequency.

2. A method of ascertaining the profile or uniformity of a portion of a small object, said method comprising the steps of:
    a. scanning a beam of electromagnetic radiation to periodically modulate the intensity of said radiation at one or more selected spatial frequencies,
    b. directing said scanned radiation at said portion of the object,
    c. collecting scanned radiation generally reflected by said portion of the object,
    d. producing an electrical signal from the collected radiation forming part of a Fourier transform response of the mean intensity of said radiation at each selected spatial frequency, and
    e. comparing the electrical signal with that produced by a reference object at a particular spatial frequency.

3. A method according to claim 2, wherein the spatial frequency is varied over a range of values so that the electrical signal is an analog signal.

4. A method of ascertaining the profile or uniformity of a portion of a small object, said method comprising the steps of:
    a. subjecting said portion of the object to a beam of electromagnetic radiation,
    b. scanning the radiation to periodically modulate its intensity at various spatial frequencies,
    c. collecting scanned radiation generally reflected by said object,
    d. producing an electrical signal from the collected scanned radiation forming part of a Fourier transform response of the mean intensity of said radiation, and
    e. comparing said signal with a reference signal representing a standard object having a corresponding portion of desired characteristics.

5. A method according to claim 4, wherein the electrical signal is an analog signal corresponding to a range of spatial frequencies.

6. An apparatus for ascertaining the sharpness of a portion of an object, said apparatus comprising;
    a. a source of electromagnetic radiation,
    b. a rotatable radiation-transmitting disc having radial grating lines thereon and arranged to scan a beam of radiation emitted by said source,
    c. means for rotating said disc at a constant speed,
    d. a variable-dimension slit for selecting an elongated part of the scanned radiation beam,
    e. means for bodily displacing the rotational axis of said disc relative to said slit to vary the spatial frequency at which the intensity of the beam is modulated by said disc,
    f. means for imaging said selected part of the scanned radiation beam onto said portion of the object for reflection thereby,
    g. a beam splitter for passing said selected part of the scanned radiation onto said portion of the object and for redirecting radiation generally reflected from said portion, and h. means for collecting said redirected radiation and for converting said collected radiation into an electrical signal having a value indicative of the sharpness of said portion.

7. An apparatus according to claim 6, wherein the means for passing radiation onto said portion of the object includes a convex lens positioned to transmit radiation passed through said beam splitter and radiation reflected by said portion, and a variable-size aperture positioned between the beam splitter and the lens and used to control the angular spread of the radiation reflected by said portion.

8. An apparatus according to claim 6, wherein the means for producing an electrical signal is composed of the series combination of a radiation diffuser for collecting the reflected radiation, a photoelectric device for converting the output of said diffuser into an electrical signal, an amplifier for amplifying said signal and a filter for filtering said amplified signal.